United States Patent [19]

Okaniwa

[11] Patent Number: 5,694,513
[45] Date of Patent: Dec. 2, 1997

[54] WAVEGUIDE DEVICE AND METHOD FOR PRODUCTION THEREOF

[75] Inventor: Kaoru Okaniwa, Hitachi, Japan

[73] Assignee: Hoechst Aktiengesellschaft, Frankfurt, Germany

[21] Appl. No.: 578,454

[22] Filed: Dec. 26, 1995

[30] Foreign Application Priority Data

Dec. 28, 1994 [JP] Japan ................. 6-328729

[51] Int. Cl.⁶ ................. G02B 1/04; G02B 6/16
[52] U.S. Cl. ................. 385/143; 385/123; 385/129
[58] Field of Search ................. 385/143, 141, 385/142, 144, 145, 123, 129

[56] References Cited

U.S. PATENT DOCUMENTS 5,108,201  4/1992  Matsurra et al. ................. 385/143

FOREIGN PATENT DOCUMENTS

| | | |
|---|---|---|
| 2-281037 | 11/1990 | Japan . |
| 4-8734 | 1/1992 | Japan . |
| 4-9807 | 1/1992 | Japan . |
| 4-328172 | 11/1992 | Japan . |
| 5-164929 | 6/1993 | Japan . |
| 6-51146 | 2/1994 | Japan . |

OTHER PUBLICATIONS

Macromolecules, vol. 25, No. 21, 1992, Easton, U.S. pp. 5858–5860 bu Shinji et al. entitled "Perfluorinated Polyimide Synthesis" Oct., 1992.

*Primary Examiner*—Phan T. H. Palmer
*Attorney, Agent, or Firm*—Curtis Morris & Safford, P.C.

[57] ABSTRACT

A waveguide device comprising at least a waveguiding layer, a cladding layer and, optionally, an adhesion-enhancing layer is disclosed. By using specific fluorinated polyimides as materials for each of the layers of the waveguide device, the process for producing the waveguide device is simplified, the production cost is reduced, and the flexibility is imparted to the waveguide device, which are not achieved in a quartz-type waveguide. Also, a single mode, a low loss at 1.3 micron band and a high moisture-resistance which are not achieved by conventional plastic-type waveguide are possible.

20 Claims, No Drawings

WAVEGUIDE DEVICE AND METHOD FOR PRODUCTION THEREOF

TECHNICAL FIELD

This invention relates to a material useful for producing a waveguide device having a high performance at a low cost and a method for the production of a waveguide device.

BACKGROUND ART

In the optical communication which has been rapidly interested for recent years, important optical parts include an optical coupler, an optical bonding-distributing element, an optical isolator, an optical fiber amplifier, etc. Of these parts, the optical coupler and the optical bonding-distributing element have been mainly those of the heat-fusion type for quartz optical fibers. However, particularly, in the case of the optical coupler, the heat-fusion type coupler is basically composed of one input and two outputs (a 1×2 coupler), and, hence, a number of 1×2 couplers must be connected as the number of output ports increases. For this reason, there are disadvantages in that not only the production yield of the optical couplers is low, but also the size of optical couplers per se becomes to be large. In the demand for reducing a size of the communication system, a large size of optical couplers which serves only for branching the light wave is a great disadvantage. In view of the above, a waveguide type coupler which does not increase a size of the device per se even when the number of output ports increases is promising. To date, a passive type waveguide device having the highest performance and reliability is a glass waveguide. Typical glass waveguides include those produced by the ion-exchange method by Corning Corp. and those produced by the flame-deposition method by NTT, but any of the methods involves complicated processes and multiple steps for producing the waveguide, and also includes a process at a high temperature of 1,000° C. or more. For this reason, the device itself becomes to be expensive, and such a high cost prevents the device from being used popularly. Also, as a technique in the future, optical circuits in computers are considered, but the glass waveguide lacks in flexibility and its application thereto is considered difficult.

For the reasons set forth above, production of waveguide from polymer materials have been extensively studied. However, there are many problems in applying the polymer materials to the waveguide, and one of the problems is that higher harmonics of C—H stretching vibration inherent to organic materials have an absorption in a near-infrared region (from 1.2 to 1.6 μm) used in the optical communication thereby causing a marked loss of light. In order to solve this problem, an attempt has been made in the well-known optical polymers, PMMA (polymethyl methacrylate) and PS (polystyrene), to replace hydrogens of these polymers by deuterium or fluorine atoms, but such polymers still have problems from the optical standpoint and in the heat-resistance. Polyimide resins are most excellent in the heat-resistance and have been studies for their application to the waveguide device. Usual polyimide resins have a high refractive index, and, when used as materials for the waveguide, the refractive index thereof markedly differs from that of the optical quartz fiber thereby causing an increase in a light-bonding loss between the optical fibers or the waveguides. Further, usual polyimide resins easily absorb moisture and are liable of causing deterioration in the performance of the device of polyimide resins. Furthermore, the polyimide resins when fabricated into films have high birefringence and become to be a waveguide having dependency on the polarization of light.

In order to overcome the problems of these polymers, an application of fluorinated polyimides to the waveguide has been studied as described in, for example, Japanese Patent Publication (Kokai) Nos. Hei-2-281037, Hei-4-8734, Hei-4-9807, Hei-5-164929 and Hei-6-51146. Introduction of fluorine atoms into the polyimide reduces the absorption loss in the wavelength band used for the optical communication while keeping the inherent high heat-resistance of the polyimide resin and, in addition, is effective for lowering the birefringence and moisture-absorbing property of the polyimide resin, and, therefore, appears to be the most promising means for polymer waveguide devices. However, in these procedures, a usual lithographic process is used for forming a relief structure of waveguide patterns, and, hence, the number of steps are involved in the production process of the waveguide and affect the production cost and the yield of products.

The fluorinated polyimide waveguide with consideration of the expedience of the production process is disclosed in Japanese Patent Publication (Kokai) No. Hei-4-328127, and, in this publication, photosensitive fluorinated polyimide precursors in which a photosensitive group has been introduced by an ester-linkage into a polyamic acid as a fluorinated polyimide precursor are disclosed. The process for producing the waveguide which can be considered with this material comprises first coating the polyimide precursor in a film form on a substrate, evaporating a solvent, exposing the film to light through a photomask having a waveguide pattern, developing an unexposed area with an appropriate solvent, heating the retained relief structure at a high temperature for imidation and fixing. However, in the imidation reaction, an alcohol comprising the photosensitive group is liberated and the relief structure which has already been formed shrinks, and such a shrinkage may cause a fatal defect in fine structures such as a Y branching.

DISCLOSURE OF THE INVENTION

In order to solve the above-described problems in the conventional technique, the present inventors synthesized various polyimides for the purpose of application in the waveguide, and, as a result of studies on the adaptability of these polyimides, found that a satisfactory waveguide having a low light loss can be formed by using a specific polyimide obtained from a tetracarboxylic acid or a derivative thereof and a diamine as a constituting element of the waveguide. The present invention was completed based on the above discovery. Generally, the waveguide is formed by providing a waveguiding layer having a high refractive index in a core portion and a cladding layer around the surface of the core portion, and, if necessary, an adhesion-enhancing layer, and the present invention is directed to materials suitable to each of these layers.

More specifically, a first embodiment of the present invention relates to a waveguide device comprising at least a waveguiding layer and a cladding layer characterized in that the waveguiding layer comprises photosensitive fluorinated polyimides having one or more repeating unit represented by the following general formula I:

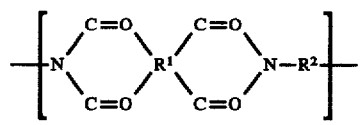

wherein $R^1$ is any one of the groups represented by the following formula II:

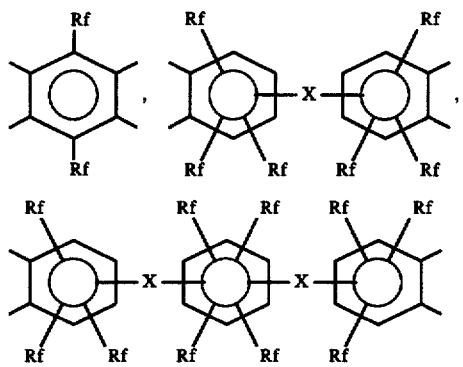

$R^2$ is any one of the groups represented by the following formula III:

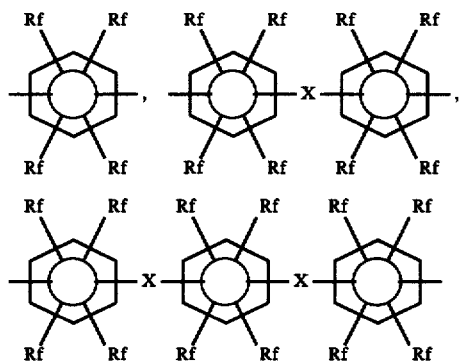

X is any one group independently selected from the groups represented by the following formula IV:

$$-O-, -\overset{O}{\underset{\|}{C}}-, -\overset{R'f}{\underset{R'f}{C}}-, -SO_2-, -S-, -O-R''f- \quad IV$$

wherein each of the groups Rf, R'f and R"f is any one of the groups independently selected from the groups represented by the following formula V:

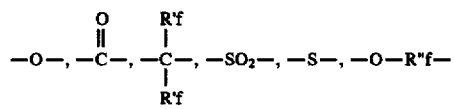

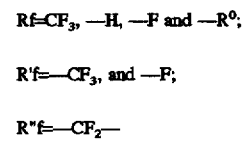

wherein $R^o$ represents a photosensitive group and, in $R^2$ of the formula III, at least one of Rf's is $R^o$. In the photosensitive fluorinated polyimide having the repeating unit represented by the above general formula I, $R^1$ and/or $R^2$ may contain two or more different groups of the formula II and the formula III. Preferably, the polyimide comprises 2 to 500 units of formula I, more preferably, 5 to 200 units and even more preferably 10 to 100 units.

A second embodiment of the present invention relates to a waveguide device comprising at least a waveguiding layer and a cladding layer characterized in that the cladding layer comprises fluorinated polyimides having one or more repeating units represented by the general formula VI:

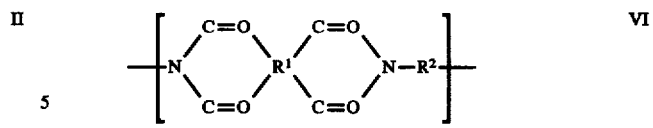

wherein $R^1$ is as defined above in the formula II, $R^2$ is as defined above in the formula III, with the proviso that none of the Rf's in $R^2$ may be the photosensitive group $R^o$, X is as defined in the formula IV above, and Rf, R'f and R"f are as defined in the formula V above. In the photosensitive fluorinated polyimide having the repeating unit represented by the above general formula VI, $R^1$ and/or $R^2$ may contain two or more different groups of the formula II and the formula III.

A third embodiment of the present invention relates to a waveguide device comprising at least a waveguiding layer, a cladding layer and an adhesion-enhancing layer characterized in that the adhesion-enhancing layer contains a siloxane-modified fluorinated polyimide having one or more repeating units represented by the general formula VII:

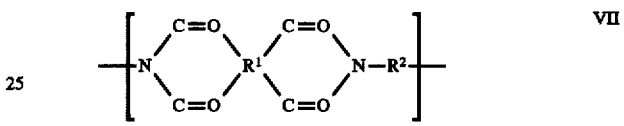

wherein $R^1$ is as defined above in the formula II, a part of $R^2$'s in the repeating units is a group represented by the formula VIII:

(wherein R represents an alkyl group), other $R^2$'s are as defined in the formula III above, X is as defined in the formula IV above; Rf, R'f and R"f are as defined in the formula V above; with the proviso that none of the Rf's in $R^2$ may be the photosensitive group $R^o$. In the photosensitive fluorinated polyimide having the repeating unit represented by the above general formula VII, $R^1$ and/or $R^2$ may contain two or more different groups of the formula II and the formula III.

A fourth embodiment of the present invention relates to a method for production of a waveguide device which comprises dissolving a low-weight additive which is capable of reacting with a photosensitive group of the photosensitive fluorinated polyimide represented by formula I above in a solution of the polyimide in a solvent to obtain a coating solution, applying the resulting coating solution on an appropriate substrate, evaporating the solvent, exposing the coated substrate to light through a photomask having a waveguide pattern, removing the additive in the unexposed area by heating thereby producing a difference in the refractive index between the exposed area and the unexposed area to form a waveguide channel.

BEST MODE FOR CARRYING OUT THE INVENTION

In the general formulae I, VI and VII, when Rf in the group represented by $R^1$ and/or $R^2$ is $-R^o$, $R^o$ denotes a photosensitive group. Specific examples of $R^o$ include an acryloyl group, a cinnamoyl group, a cinnamylidene group, a chalcone residual group, an isocoumalin residual group, a 2,5-dimethoxystilbene residual group, a styrylpyridium residual group, a thymine residual group, an a-phenylmaleimido group, an anthracene residual group, a 2-pyrone residual group, an o-naphthoquinonediazide residual group and an o-naphthoquinonediazide sulfonic acid group. Also, in the presence of a photoacid generating agent, a glycidiyl group can be included in $R^0$.

Particularly preferred examples of $R^1$ include a 2,2-bisphenylhexafluoropropane residual group and a 2,2-bis(4-(4'-phenoxy)phenyl)hexafluoropropane residual group.

Particularly preferred examples of $R^2$ include a 2,2-bisphenylhexafluoropropane residual group and a 2,2-bis(4-(4'-phenoxy)phenyl)hexafluoropropane residual group.

The substituent R in the group represented by the general formulae VII and VIII represents an alkyl group, and each of R's may be the same or different. Preferred examples of R include a methyl group, an ethyl group, a methoxy group, an ethoxy group, an n-propyl group and an isopropyl group, and a particularly preferred group is a methyl group.

In the polymer having a repeating unit represented by the general formula I, VI or VII used in the present invention, $R^1$'s which are elements constituting the repeating unit may be the same, and may contain two or more different groups of the formula II. Similarly, $R^2$'s may be the same, and may contain two or more different groups of the formula III. Also, the molecular weight of the polymer having the repeating unit represented by these general formulae is not specifically restricted. In the polymer having the repeating unit represented by the general formula VII, a part of $R^2$'s is a group represented by the formula VIII and the rest is a group represented by the formula II, and a proportion of the both groups is not specifically restricted, and the polymer having an optional proportion can be used.

A tetracarboxylic acid or a derivative thereof used for preparing the fluorinated polyimide or the precursor thereof represented by the general formulae I, VI and VII can be any compound as long as a monovalent element bonded to a carbon atom in an alkyl group, a phenyl group and the like in the molecule is substituted by a fluorine atom or a perfluoroalkyl group.

The tetracarboxylic acid as well as an acid anhydride, an acid chloride and an ester thereof as derivatives of tetracarboxylic acid include the compounds described below, but these examples are shown with reference to only tetracarboxylic acids: (trifluoromethyl)pyromellitic acid, di(trifluoromethyl)pyromellitic acid, di(heptafluoropropyl) pyromellitic acid, pentafluoroethylpyromellitic acid, bis{3, 5-di(trifluoromethyl)phenoxy}pyromellitic acid, 2,3,3',4'-biphenyltetracarboxylic acid, 3,3',4,4'-tetracarboxydiphenyl ether, 2,3,3',4'-tetracarboxydiphenyl ether, 3,3',4,4'-benzophenonetetracarboxylic acid, 2,3,6,7-tetracarboxynaphthalene, 1,4,5,7-tetracarboxynaphthalene, 1,4,5,6-tetracarboxynaphthalene, 3,3',4,4'-tetracarboxydiphenylmethane, 3,3',4,4'-tetracarboxydiphenylsulfone, 2,2-bis(3,4-dicarboxyphenyl)propane, 2,2-bis(3,4-dicarboxyphenyl)-hexafluoropropane, 5,5'-bis(trifluoromethyl)-3,3',4,4'-tetracarboxydiphenyl, 2,2',5,5'-tetrakis (trifluoromethyl)-3,3',4,4'-tetracarboxydiphenyl, 5,5'-bis(trifluoromethyl)-3,3',4,4'-tetracarboxydiphenyl ether, 5,5'-bis(trifluoromethyl)-3,3',4,4'-tetracarboxybenzophenone, bis{(trifluoromethyl)dicarboxyphenoxy}benzene, bis{(trifluoromethyl)dicarboxyphenoxy)(trifluoromethyl)benzene, bis(dicarboxyphenoxy)(trifluoromethyl)benzene, bis(dicarboxyphenoxy)bis(trifluoromethyl)benzene, bis(dicarboxyphenoxy)tetrakis(trifluoromethyl)benzene, 3,4,9,10-tetracarboxyperylene, 2,2-bis{4-(3,4-dicarboxyphenoxy) phenyl}propane, butanetetracarboxylic acid, cyclopentanetetracarboxylic acid, 2,2-bis{4-(3,4-dicarboxyphenoxy)phenyl}hexafluoropropane, bis{(trifluoromethyl)dicarboxyphenoxy}diphenyl, bis{(trifluoromethyl)dicarboxyphenoxy}bis(trifluoromethyl) biphenyl, bis{(trifluoromethyl)dicarboxyphenoxy}diphenyl ether, bis(dicarboxyphenoxy)bis(trifluoromethyl)biphenyl, bis(3,4-dicarboxyphenyl)dimethylsilane, 1,3-bis(3,4-dicarboxyphenyl)tetramethyldisiloxane, difluoropyromellitic acid, 1,4-bis(3,4-dicarboxytrifluorophenoxy) tetrafluorobenzene, and 1,4-bis(3,4-dicarboxytrifluorophenoxy)octafluorobiphenyl.

Examples of diamines include m-phenylenediamine, 2,4-diaminotoluene, 2,4-diaminoxylene, 2,4-diaminodenylene, 4-(1H,1H,11H-eicosafluoroundecanoxy)-1,3-diaminobenzene, 4-(1H,1H-perfluoro-1-butanoxy)-1,3-diaminobenzene, 4-(1H,1H-perfluoro-1-heptanoxy)-1,3-diaminobenzene, 4-(1H,1H,-perfluoro-1-octanoxy)-1,3-diaminobenzene, 4-pentafluorophenoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H,2H-perfluoro-1-dodecanoxy)-1,3-diaminobenzene, p-phenylenediamine, 2,5-diaminotoluene, 2,3,5,6-tetramethyl-p-phenylenediamine, 2,5-diaminobenzotrifluoride, bis (trifluoromethyl)phenylenediamine, diaminotetra (trifluoromethyl)benzene, diamino(pentafluoroethyl) benzene, 2,5-diamino(perfluorohexyl)benzene, 2,5-diamino (perfluorobutyl)benzene, benzidine, 2,2'-dimethylbenzidine, 3,3'-dimethylbenzidine, 3,3'-dimethoxybenzidine, 2,2'-dimethoxybenzidine, 3,3',5,5'-tetramethylbenzidine, 3,3'-diacetylbenzidine, 2,2-bis(trifluoromethyl)-4,4'-diaminobiphenyl, octafluorobenzidine, 3,3'-bis (trifluoromethyl)-4,4'-diaminobiphenyl, 4,4'-diaminodiphenyl ether, 4,4'-diaminodiphenylmethane, 4,4'-diaminodiphenylsulfone, 2,2-bis(p-aminophenyl)propane, 3,3'-dimethyl-4,4'-diaminodiphenyl ether, 3,3'-dimethyl-4,4'-diaminodiphenylmethane, 1,2-bis(anilino)ethane, 2,2-bis (p-aminophenyl)hexafluoropropane, 1,3-bis(anilino) hexafluoropropane, 1,4-bis(anilino)-octafluorobutane, 1,5-bis(anilino)decafluoropentane, 1,7-bis(anilino) tetradecafluoroheptane, 2,2'-bis(trifluoromethyl)4,4'-diaminodiphenyl ether, 3,3'-bis(trifluoromethyl)-4,4'-diaminodiphenyl ether, 3,3',5,5'-tetrakis(trifluoromethyl-4, 4'-diaminodiphenyl ether, 3,3'-bis(trifluoromethyl)-4,4'-diaminobenzophenone, 4,4'-diamino-p-terphenyl, 1,4-bis(p-aminophenyl)benzene, p-bis(4-amino-2-trifluoromethylphenoxy)benzene, bis(aminophenoxy)bis (trifluoromethyl)benzene, bis(aminophenoxy)tetrakis-(trifluoromethyl)benzene, 4,4'''-diamino-p-quaterphenyl, 4,4'-bis(p-aminophenoxy)biphenyl, 2,2-bis{4-(p-aminophenoxy)phenyl}propane, 4,4'-bis(3-aminophenoxydiphenyl)diphenylsulfone, 2,2-bis{4-(4-aminophenoxy)phenyl}hexafluoropropane, 2,2-bis{4-(3-aminophenoxy)phenyl}hexafluoropropane, 2,2-bis{4-(4-aminophenoxy)phenyl}-hexafluoropropane, 2,2-bis{4-(2-aminophenoxy)phenyl}hexafluoropropane, 2,2-bis{4-(4-aminophenoxy)-3,5-dimethylphenyl}hexafluoropropane, 2,2-bis-{4-(4-aminophenoxy)-3,5-ditrifluoromethylphenyl}hexafluoropropane, 4,4'-bis-(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenylsulfone, 4,4'-bis (3-amino-5-trifluoromethylphenoxy)diphenylsulfone, 2,2-bis{4-(4-amino-3-trifluoromethylphenoxy) phenyl}hexafluoropropane, bis{(trifluoromethyl) aminophenoxy}diphenyl, bis[{(trifluoromethyl)aminophenoxy}phenyl]hexafluoropropane, diaminoanthraquinone, 1,5-diaminonaphthalene, 2,6-diaminonaphthalene, bis{2-[(aminophenoxy)phenyl]hexafluoroisopropyl}benzene, bis(2,3,5,6-tetrafluoro-4-aminophenyl) ether, bis(2,3,5,6-tetrafluoro-4-aminophenyl) sulfide, 1,3-bis(3-aminopropyl)tetramethyldisiloxane, 1,4-bis(3-aminopropyldimethylsilyl)benzene, bis(4-aminophenyl)diethylsilane, 1,3-diaminotetrafluorobenzene, bis(4-aminophenyl)diethylsilane, 1,3-diaminotetrafluorobenzene, 1,4-diaminotetrafluorobenzene and 4,4'-bis(tetrafluoroaminophenoxy)octafluorobiphenyl.

As described hereinafter, it is necessary that these compounds are substituted with a OH group for introducing a photosensitive group.

The fluorine-containing polyamic acid which is a precursor of the photosensitive fluorinated polyimide used in the present invention can be prepared in the same manner as in the production of usual polyamic acids, and generally the reaction is conducted in a polar organic solvent such as N-methyl-2-pyrrolidone, N,N-dimethylacetamide and N,N-dimethylformamide. In the present invention, each of the diamine and the tetracarboxylic acid or the derivative thereof can be used not only as a single compound, but also as a mixture thereof. In both cases, the total molar amount of a single or plurality of diamines and the total molar amount of a single or plurality of tetracarboxylic acids or derivatives thereof are equal or substantially equal.

The fluorinated polyimide which is a precursor of the photosensitive fluorinated polyimide used in the present invention can be prepared by first forming the fluorinated polyamic acid by the above-described reaction between the diamine and the tetracarboxylic acid or the derivative thereof in the above-described solvent, and, after adding m-xylylene, etc., the mixture was dehydrated by azeotropy to effect an imidation reaction. Thereafter, a photosensitive group is introduced into the resulting polyimide.

The procedure for introducing a photosensitive group can be achieved by a conventional method. In an example of the method, a monomer having a OH group is used as either or both of the tetracarboxylic acid or the derivative thereof and the diamine, and the OH group is reacted with an acid chloride such as cinnamoyl chloride and acryloyl chloride. The photosensitive group may be introduced into the polymer after polymerization of the main chain.

In the present invention, a waveguide comprising the waveguiding layer, the cladding layer and the adhesion-enhancing layer is particularly preferred, and a typical process for producing such a waveguide is described hereinafter. However, it is understood that other waveguiding layer, cladding layer and adhesive reinforcing layer generally used may be used in combination with the layers according to the present invention.

A siloxane-modified fluorinated polyimide precursor is coated on an inorganic substrate such as glass and silicon, and imidated in a usual manner to convert it into a siloxane-modified fluorinated polyimide having one or more repeating units represented by the above general formula VII to prepare an adhesion-enhancing layer. Generally, when the content of fluorine atoms in the polyimide increases, adhesion of the polyimide to the inorganic substrate markedly deteriorates, and the adhesion-enhancing layer is provided for improving such a defect. However, when a commercially available substrate of organic materials such as a polyimide film or a polycarbonate plate is used, it is not necessary to use the siloxane-modified fluorinated polyimide precursor as an adhesion-enhancing layer.

The above-described siloxane-modified fluorinated polyimide precursor has one or more of the repeating units represented by the following formula IX:

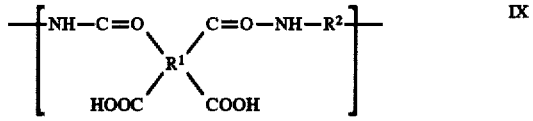

wherein $R^1$ is as defined in the formula II above, and a part of $R^2$'s in each of the repeating units is a group represented by the following formula VIII:

wherein R independently represents an alkyl group, and other $R^2$'s are as defined in the formula III above, wherein X is as defined in the formula IV, and Rf, R'f and R"f are as defined in the formula V above, with the proviso that none of Rf's in $R^2$ may be a photosensitive group $R^0$.

The fluorinated polyimide precursor is coated on the above-described adhesion-enhancing layer or an organic substrate, and imidated by heating at a temperature of 200° C. or more to form a fluorinated polyimide having one or more of the repeating units represented by the general formula VI above thereby producing a cladding layer.

The above-described fluorinated polyimide precursor has one or more of the repeating units represented by the following formula X:

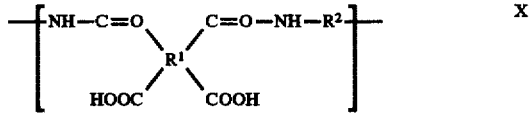

wherein $R^1$ is as defined in the formula II above, $R^2$ is as defined in the formula III above, with the proviso that none of Rf's in $R^2$ may be the photosensitive group $R^0$, X is as defined in the formula IV above, and Rf, R'f and R"f are as defined in the formula V above.

Further, a photosensitive fluorinated polyimide is coated on the cladding layer, and exposed to light to generate a difference in a refractive index between the exposed area and the unexposed area. In this case, a low molecular weight additive which is capable of reacting with the photosensitive group thereby generating the difference in the refractive index has been added to a polymer coating solution of the photosensitive fluorinated polyimide, and the additive is evaporated by heating after exposure.

Furthermore, the above-described fluorine-containing polyimide precursor may be coated on the resulting waveguiding channel, followed by imidation by heating to provide the cladding layer.

Examples of the low molecular weight additive used for generating the difference in the refractive index include a vinyl monomer such as styrene and vinyltoluene, an acrylic compound such as acrylic acid and 2-ethylhexyl acrylate, a methacrylic compound such as methacrylic acid, methyl methacrylate and ethyl methacrylate which are used as crosslinking agents; benzyl dimethyl ketal, 1-phenyl-1,2-propanedione-2-(O-ethoxycarbonyl) oxime, benzophenone, benzil, and benzoisopropyl ether which are used as photopolymerization initiators; bis(4-dimethylaminophenyl) ketone, and 4,4'-bisdiethylaminobenzophenone which are used as sensitizing agents; 4,4'-diazidochalcone, 1,3-bis(4'-azidobenzal)acetone, 2,6-bis(4'-azidobenzal)- cyclohexanone, 2,6-bis(4'-azidobenzal)-4-methylcyclohexanone, and sodium 2,6-bis(4'-azidobenzal) methyl-cyclohexanone-2,2'-disulfonate used as photocrosslinking agents. Generally, when the low molecular weight additives used have an electron absorption at a shorter wavelength side than that of the photosensitive fluorinated polyimide as a main agent, the refractive index of the exposed area becomes lower than that of the unexposed area, and, conversely, when the low molecular weight additives used have an electron absorption at a longer wavelength side than that of the photosensitive fluorinated polyimide, the refractive index of the exposed area becomes higher than that of the unexposed area. For example, when methyl methacrylate is used as an additive, the exposed area has a lower refractive index than the unexposed area, and when benzil is used, the exposed area has a higher refractive index than the unexposed area. However, it should be understood that the above judgement on the control of additives from the electron absorption wavelength thereof is a general guideline, and that, from the practical standpoint, confirmation by experimentations for each of the additives to be used would be necessary. This is due to the fact that the main agent and the additive may have complicated wavelength distribution in refractive indexes, and, in addition, the photoreaction may possibly result in complicated reactions, i.e., not only an addition reaction of the additive to the main agent, but also a simultaneous crosslinking reaction, etc.

EXAMPLES

The present invention is hereinafter described in more detail with reference to some examples. It would be, however, understood to the skilled artisan that various polyimide-type waveguides can be obtained by using a combination of various polyimides as well as various waveguide structures, and, therefore, the present invention is not limited to these examples. In the examples, the loss of light transmission was determined by the cut-back method by passing the light having a wavelength of 1.3 μm through the waveguide formed.

Also, the light from the output end face of the waveguide was focused on a CCD camera by an objective lens, and the output beam pattern was analyzed by Beam Craber Model 6100 produced by Photon Co., Ltd.

Example 1

41.44 g of 2,2-bis[4-(4-aminophenoxy)phenyl] hexafluoropropane and 16.04 g of TSL 9386 (a product of Toshiba Silicone Co., Ltd.) were dissolved in 500 ml of dimethylacetamide (DMAc) under a nitrogen atmosphere. After thoroughly dissolving, 44.4 g of hexafluoroisopropylidene-2,2-bis(phthalic anhydride) (6FDA) was added in a powder form to the above-prepared solution. The resulting solution was stirred at room temperature under a nitrogen atmosphere for 3 days and then passed through a 0.2 micron filter. The resulting solution was referred to as Solution A.

Example 2

43.7 g of 2,2-bis[4-(4-aminophenoxy)phenyl] hexafluoropropane was dissolved in 400 ml of DMAc under a nitrogen atmosphere. After thoroughly dissolving, 56.4 g of 6FDA was added in a powder form to the above-prepared solution. The resulting solution was stirred at room temperature under a nitrogen atmosphere for 3 days and then passed through a 0.2 micron filter. The resulting solution was referred to as Solution B.

Example 3

25.3 g of 2,2-bis(3-amino-4-hydroxyphenyl) hexafluoropropane and 35.92 of 2,2-bis[4-(4-aminophenoxy)phenyl]hexafluoropropane were dissolved in 1 liter of N-methylpyrrolidine (NMP). After thoroughly dissolving, 61.58 g of 6FDA was added in a powder form. The resulting solution was stirred at room temperature under a nitrogen atmosphere for 3 days. Further, 250 ml of m-xylene was added to the solution, and the mixture was allowed to react by heating at 150° C. under weakly reduced pressure to effect dehydration (imide formation) by azeotropy. This operation was continued until the amount of the aqueous phase of the azeotropic mixture recovered by distillation had become a theoretical amount (for about 4 hours), and, then, the resulting polymer solution was added dropwise to water for re-precipitation. The precipitate was recovered, thoroughly dried, and dissolved in 500 ml of tetrahydroxyfuran (THF). 27.97 g of triethylamine was added to the resulting solution, and a 10 wt % THF solution of acryloyl chloride was slowly added dropwise. After completion of the dropwise addition, the mixture was continuously stirred for an additional two days. The resulting polymer was re-precipitated in water, recovered, dried, dissolved in THF, and re-precipitated again in water, and these operations were repeated 3 times. After thoroughly drying the polymer, it was dissolved in cyclohexanone to obtain a 30 wt % solution. To the solution were added 23.23 g of benzil and 1 g of Michler's ketone to 100 g of the polymer, followed by passing through a 0.2 micron filter to obtain a solution. The resulting solution was referred to as Solution C.

Example 4

A polyamic acid solution obtained in the same manner as described in Example 2 was re-precipitated in water. The precipitate was recovered and dried. The polymer thus-obtained was dissolved in n-hexanol to obtain a 10 wt % solution thereof which was then filtered through a 0.2 micron filter. The resulting solution was referred to as Solution D, Example 5

The above-described Solution A was spin-coated on a silicon substrate, and the coated substrate was subjected to heat treatments at 70° C. for 2 hours, at 100° C. for 2 hours, at 160° C. for 2 hours and at 230° C. for 2 hours in a nitrogen-purged oven to form an adhesion-enhancing layer. Then, Solution B was spin-coated on this layer, and the coated substrate was subjected to heat treatments at 90° C. for 90 seconds on a hot plate, and then at 160° C. for 2 hours and at 230° C. for 2 hours in a nitrogen-purged oven to form a lower cladding layer. Further, Solution C was spin-coated on the lower cladding layer to a final thickness of about 10 microns, and the coated substrate was heated at 90° C. on a hot plate for 3 minutes to evaporate the solvent. The resulting coated substrate was irradiated with light from a high pressure mercury lamp for 5 minutes through a photomask having a waveguide pattern. Thereafter, the exposed substrate was subjected to a heat treatment at 160° C. for 8 hours in a nitrogen-purged oven to obtain a buried waveguide structure. Further, Solution D was spin-coated thereon, and the coated substrate was subjected to heat treatments at 90° C. on a hot plate for 90 seconds, at 160° C. for 2 hours and at 230° C. for 2 hours in a nitrogen-purged oven to obtain a waveguide device.

Example 6

The edge faces of the thus-obtained waveguide were trimmed by cleavage of the silicon substrate. A light from a single mode optical fiber was transmitted through the waveguide by an end face coupling method. An output beam was introduced into a CCD camera by means of an objective lens. The shape of the beam was analyzed and ascertained to be a single mode. The waveguide loss was found to be 0.2 dB/cm by the cutback method. It was also confirmed that the beam was divided into eight branches in a 1×8 branch waveguide.

Example 7

A waveguide was formed on a commercially available polyimide film in the same manner as in Example 5, and it was confirmed that a flexible waveguide could be obtained. However, in this example, Solution A was not used.

Industrial Applicability

According to the present invention, it is possible to simplify the production process, to reduce the production cost and to produce flexible waveguide devices which can not be achieved by the conventional quartz waveguide device. Also, it is possible to produce a waveguide having a single mode, a low-loss at a 1.3 micron band and a high moisture resistance which can not be achieved by the conventional plastic waveguide.

What is claimed is:

1. A waveguide device comprising at least a waveguiding layer and a cladding layer, wherein the waveguiding layer comprises a photosensitive fluorinated polyimide having one or more repeating units of the following formula I:

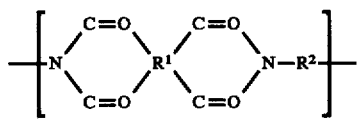

wherein $R^1$ is any one of the groups of the following formula II:

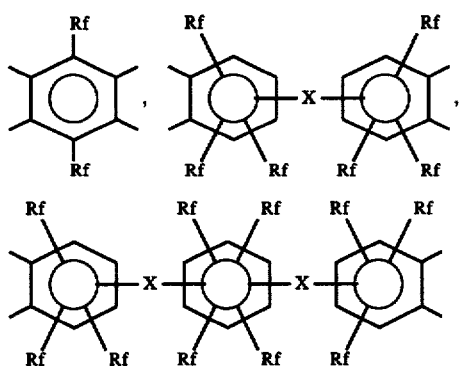

$R^2$ is any one of the groups of the following formula III:

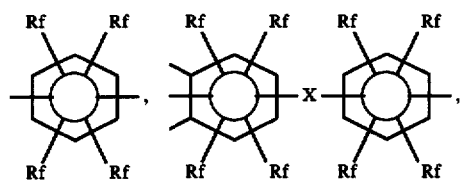

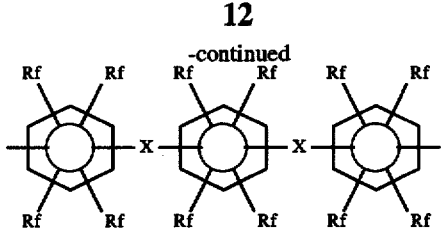

X is any one group independently selected from the groups of the following formula IV:

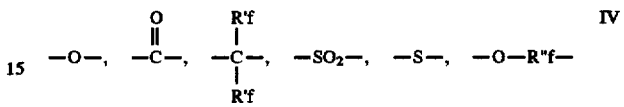

wherein each of the groups Rf, R'f and R"f is any one of the groups independently selected from the groups of the following formula V:

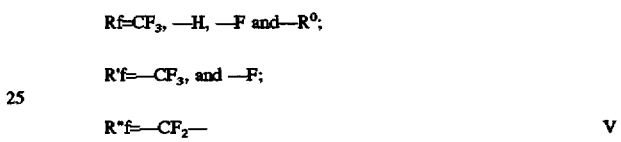

wherein $R^o$ is a photosensitive group, and at least one of Rf in $R^2$ of the formula III is $R^o$.

2. A waveguide device according to claim 1, wherein $R^o$ is selected from an acryloyl group, a cinnamoyl group, a cinnamylidene group, a chalcone residual group, an isocoumalin residual group, a 2,5-dimethoxystilbene residual group, a styrylpyridium residual group, a thymine residual group, an a-phenylmaleimido group, an anthracene residual group, a 2-pyrone residual group, an o-naphthoquinonediazide residual group, an o-naphthoquinonediazide sulfonic acid group, and, in the presence of a photoacid generating agent, a glycidiyl group.

3. A waveguide device according to claim 1 wherein the waveguiding layer consists of the photosensitive fluorinated polyimide.

4. A waveguide device according to claim 1, wherein said polyimide comprises from 2 to 500 repeating units of formula I.

5. A waveguide device according to claim 1, wherein said polyimide comprises from 5 to 200 repeating units of formula I.

6. A waveguide device according to claim 1, wherein said polyimide comprises from 10 to 100 repeating units of formula I.

7. A waveguide device comprising at least a waveguiding layer and a cladding layer wherein the cladding layer comprises fluorinated polyimides having one or more repeating units of the following formula VI:

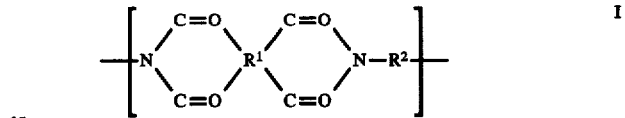

wherein $R^1$ is any one of the groups of the following formula II:

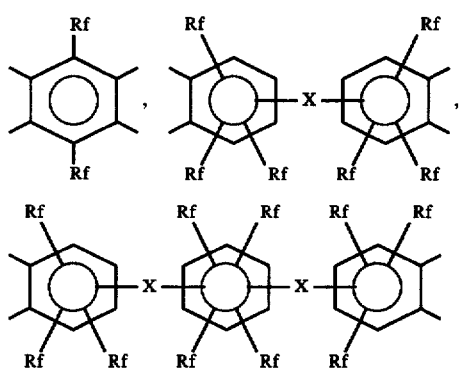

R² is any one of the groups of the following formula III:

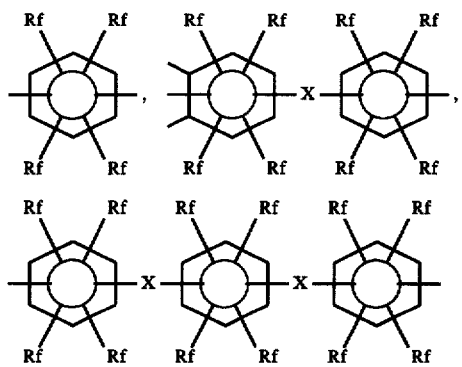

X is any one group independently selected from the groups of the following formula IV:

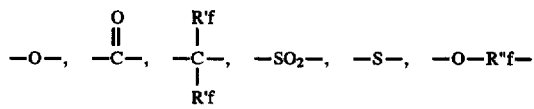

wherein each of the groups Rf, R'f and R"f is any one of the groups independently selected from the groups of the following formula V:

Rf=CF₃, —H, —F and —R⁰;

R'f=—CF₃, and —F;

R"f=—CF₂—    V wherein R⁰ is a photosensitive group, with the proviso that none of Rf in R² may be the photosensitive group R⁰.

8. A waveguide device according to claim 7, wherein R⁰ is selected from an acryloyl group, a cinnamoyl group, a cinnamylidene group, a chalcone residual group, an isocoumalin residual group, a 2,5-dimethoxystilbene residual group, a styrylpyridium residual group, a thymine residual group, an a-phenylmaleimido group, an anthracene residual group, a 2-pyrone residual group, an o-naphthoquinonediazide residual group, an o-naphthoquinonediazide sulfonic acid group, and, in the presence of a photoacid generating agent, a glycidiyl group.

9. A waveguide device according to claim 7, wherein said polyimide comprises from 2 to 500 repeating units of formula I.

10. A waveguide device according to claim 7, wherein the cladding layer consists of the fluorinated polyimides.

11. A waveguide device according to claim 7, wherein said polyimide comprises from 5 to 200 repeating units of formula I.

12. A waveguide device comprising at least a waveguiding layer, a cladding layer and an adhesion-enhancing layer, wherein the adhesion-enhancing layer comprises siloxane-modified fluorinated polyimides having one or more repeating units of the formula VII:

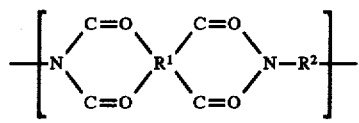

wherein R¹ any one of the groups of the following formula II:

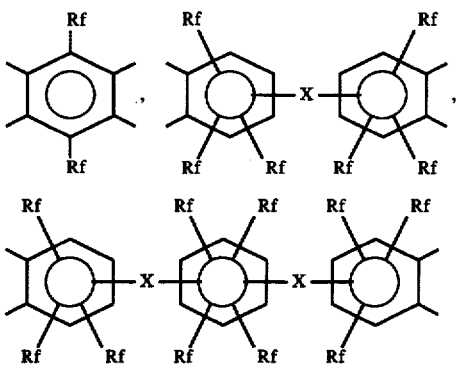

R² is any one of the groups of the following formula III:

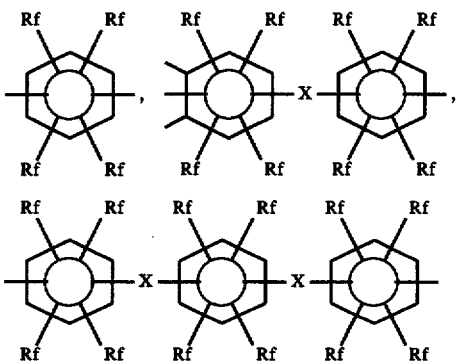

X is any one group independently selected from the groups of the following formula IV:

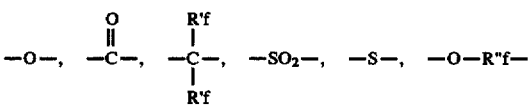

wherein each of the groups Rf, R'f and R"f is any one of the groups independently selected from the groups of the following formula V:

Rf=CF₃, —H, —F and —R⁰;

R'f=—CF₃, and —F;

R"f=—CF₂—    V wherein R⁰ is a photosensitive group, and at least one R² in the repeating units is a group of the formula VIII:

wherein R is an alkyl group, with the proviso that none of Rf in $R^2$ may be the photosensitive group $R^o$.

13. A waveguide device according to claim 12, wherein $R^o$ is selected from an acryloyl group, a cinnamoyl group, a cinnamylidene group, a chalcone residual group, an isocoumalin residual group, a 2,5-dimethoxystilbene residual group, a styrylpyridium residual group, a thymine residual group, an a-phenylmaleimido group, an anthracene residual group, a 2-pyrone residual group, an o-naphthoquinonediazide residual group, an o-naphthoquinonediazide sulfonic acid group, and, in the presence of a photoacid generating agent, a glycidiyl group.

14. A waveguide device according to claim 12, wherein said polyimide comprises from 2 to 500 repeating units of formula I.

15. A waveguide device according to claim 12 wherein the adhesion-enhancing layer consists of the siloxane-modified fluorinated polyimides.

16. A waveguide device according to claim 12, wherein said polyimide comprises from 5 to 200 repeating units of formula I.

17. A method for producing a waveguide device which comprises dissolving a low molecular weight additive which is capable of reacting with a photosensitive group of the photosensitive fluorinated polyimide of formula I:

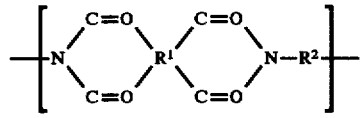

wherein $R^1$ is any one of the groups of the following formula II:

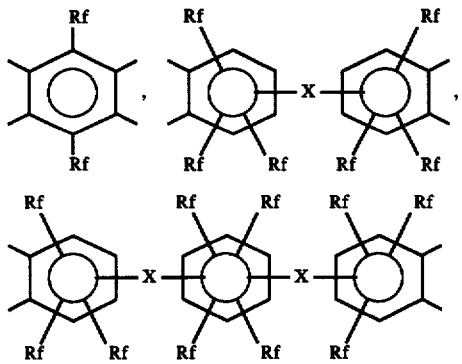

$R^2$ is any one of the groups of the following formula III:

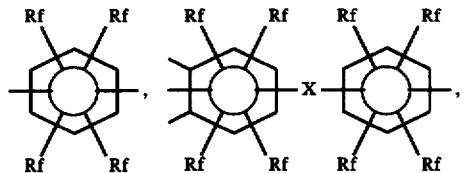

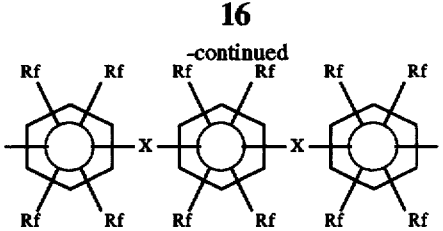

X is any one group independently selected from the groups of the following formula IV:

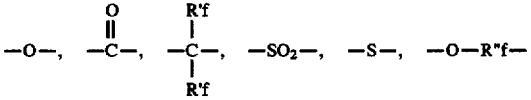

wherein each of the groups Rf, R'f and R"f is any one of the groups independently selected from the groups of the following formula V:

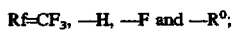

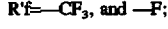

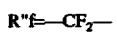

wherein $R^o$ is a photosensitive group, and at least one of Rf in $R^2$ of the formula III is $R^o$ in a solution of said polyimide in a solvent to obtain a coating solution, applying the resulting coating solution on a substrate, evaporating the solvent, exposing the coated substrate to light through a photomask having a waveguide pattern, removing the additive in the unexposed area by heating to produce a difference in the refractive index between the exposed area and the unexposed area to form a waveguide channel.

18. A waveguide device according to claim 17, wherein $R^o$ is selected from an acryloyl group, a cinnamoyl group, a cinnamylidene group, a chalcone residual group, an isocoumalin residual group, a 2,5-dimethoxystilbene residual group, a styrylpyridium residual group, a thymine residual group, an a-phenylmaleimido group, an anthracene residual group, a 2-pyrone residual group, an o-naphthoquinonediazide residual group, an o-naphthoquinonediazide sulfonic acid group, and, in the presence of a photoacid generating agent, a glycidiyl group.

19. A waveguide device according to claim 17, wherein said polyimide comprises from 2 to 500 repeating units of formula I.

20. A waveguide device according to claim 17, wherein said polyimide comprises from 5 to 200 repeating units of formula I.

\* \* \* \* \*